Dec. 25, 1951　　　G. W. JOHNSON　　　2,579,827
WIENER ROASTER

Filed Sept. 8, 1947　　　　　　　　　　　　4 Sheets-Sheet 1

INVENTOR.
George Walter Johnson
BY
his Attorney.

Dec. 25, 1951  G. W. JOHNSON  2,579,827
WIENER ROASTER

Filed Sept. 8, 1947  4 Sheets-Sheet 3

INVENTOR.
George Walter Johnson
BY
his Attorney.

Dec. 25, 1951  G. W. JOHNSON  2,579,827
WIENER ROASTER

Filed Sept. 8, 1947  4 Sheets-Sheet 4

INVENTOR.
George Walter Johnson
BY
his Attorney.

Patented Dec. 25, 1951

2,579,827

UNITED STATES PATENT OFFICE 2,579,827

WIENER ROASTER

George Walter Johnson, Emeryville, Calif., assignor to William Bence, Los Angeles, Calif.

Application September 8, 1947, Serial No. 772,755

4 Claims. (Cl. 99—391)

My invention relates to devices for preparing foods for serving of the kind in which a meat filling held in a generally cylindrical form in an edible casing is eaten within a hot bun.

The invention will be hereinafter described as applied to the heating of wieners and the split buns in which they are customarily eaten, but the device of the invention is not necessarily restricted to use with a particular type of food product.

Wieners are a favorite food where a quickly eaten but nourishing meal is desired, as for instance at sporting events and picnics and it is often required that a caterer should be able to supply a large number of hot wieners and buns as quickly as possible to deal with peak demands.

It is accordingly an object of my invention to provide a device or machine in which wieners and buns may be rapidly heated and from which the prepared food is easily and rapidly served.

It is generally required that devices used in the preparation of foods for the public should be capable of disassembly for the purpose of thoroughly cleaning all parts and it is a further object of my invention to provide a machine in which all parts may be quickly taken apart, cleaned and re-assembled.

Yet another object of my invention is to provide a hot food preparing machine of clean and attractive appearance in which the parts are so arranged that the cooking and heating of the food cannot render the machine dirty looking and so cause an unappetising appearance of the food contained therein or make it difficult to clean the device.

A still further object of the invention is to provide a hot food preparing machine of simple and sturdy construction and arrangement, thus reducing the time required for maintenance and reducing liability of the machine getting out of order to a minimum.

Yet another object of my invention is to provide a wiener roasting machine utilizing the heat rising from heating element cooking the wieners, to worm the buns and to provide means for humidifying the buns.

Still further objects and features of the invention will hereinafter appear from the following description taken in conjunction with the accompanying drawings in which is illustrated an embodiment of the invention at present deemed preferable by me.

In the drawings:

Figure 5 is a fragmentary detail showing a sausage of the wiener type in the position typical of the commencement of the cooking operation thereon.

Figure 1:
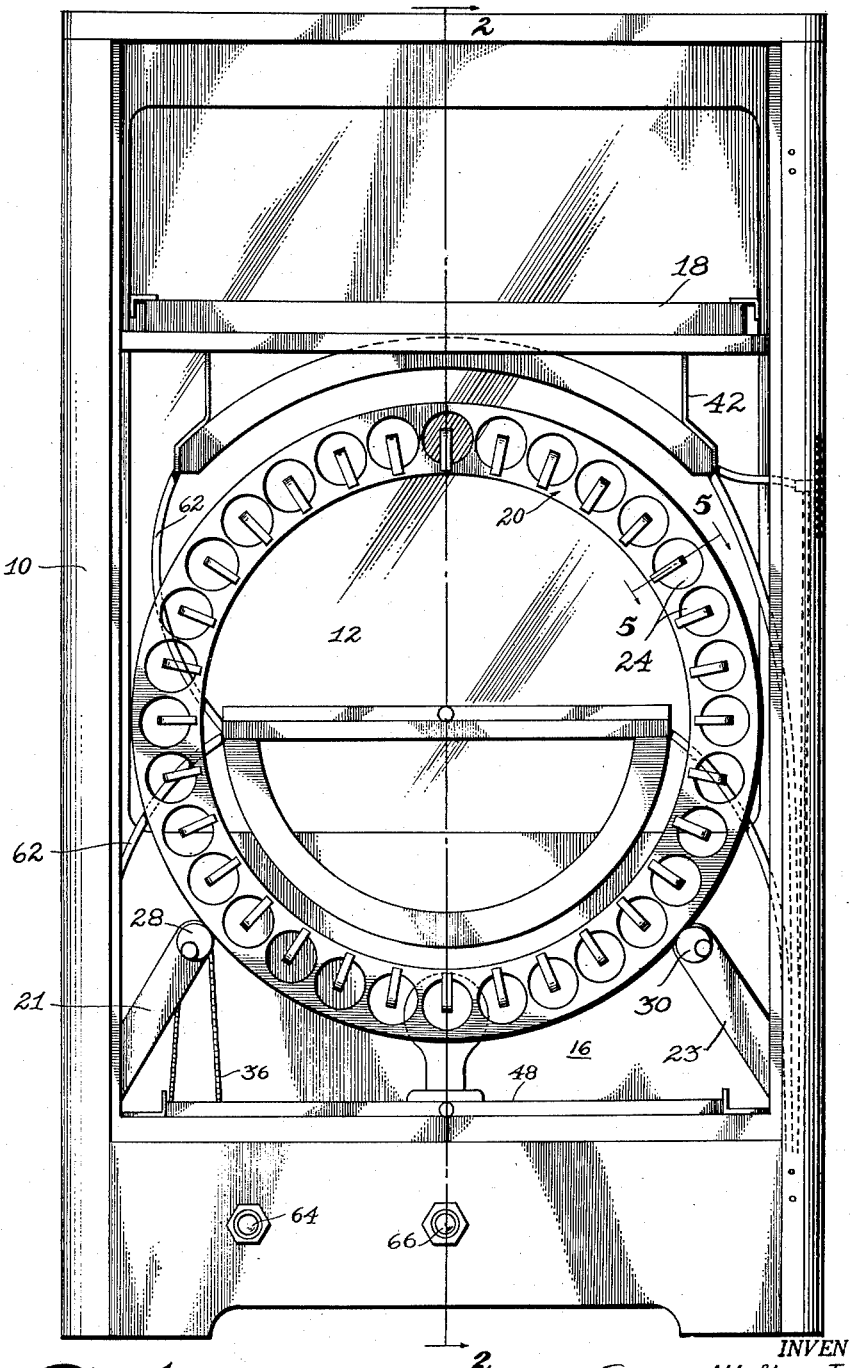
Figure 1 is a front view of the completely assembled machine which is provided with a glass door.
Figure 2:
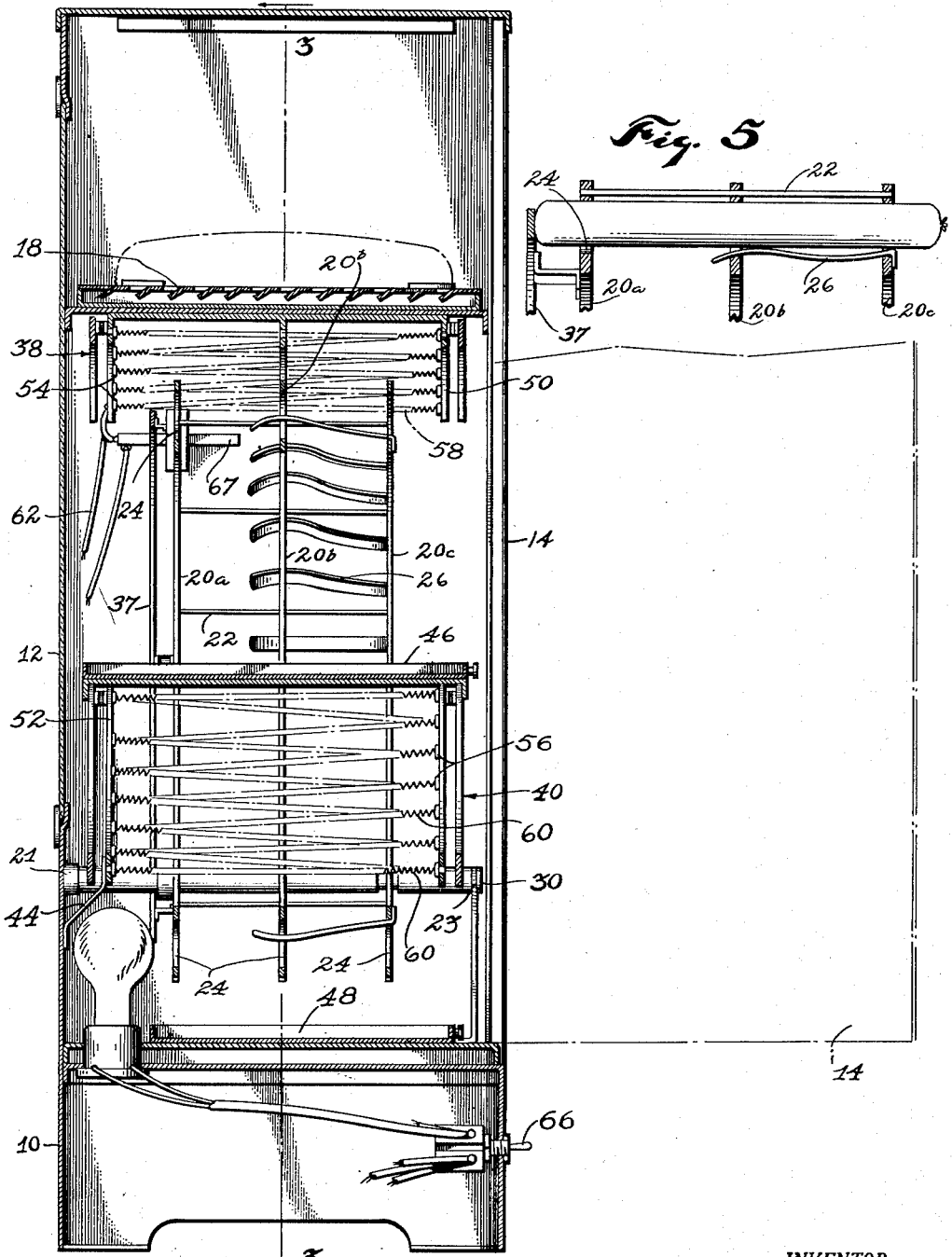
Figure 2 is cross section on the line 2—2 of Fig. 1 with drip trays removed.
Figure 3:
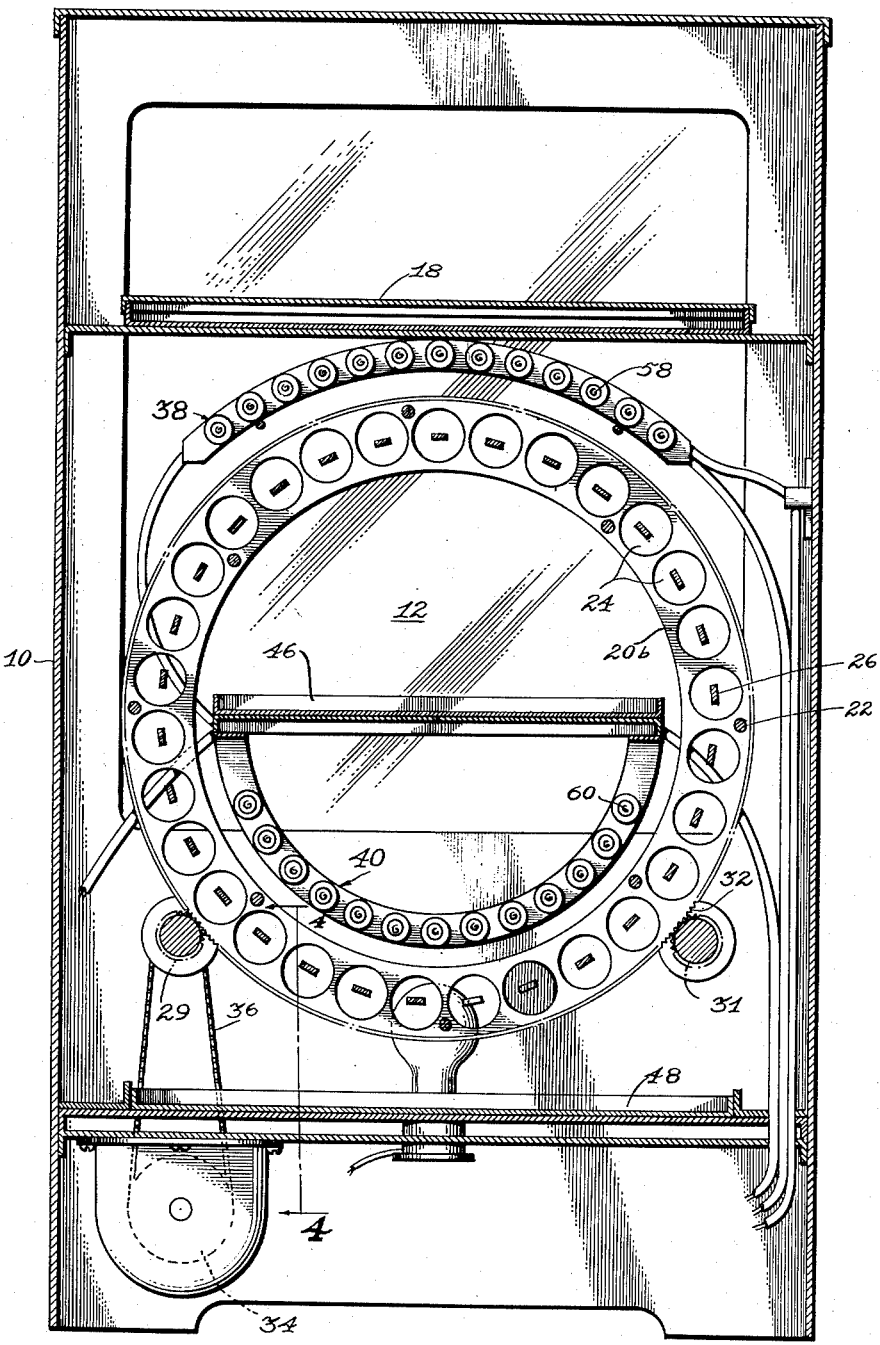
Figure 3 is a cross section on the line 3—3 of Fig. 2.
Figure 4:
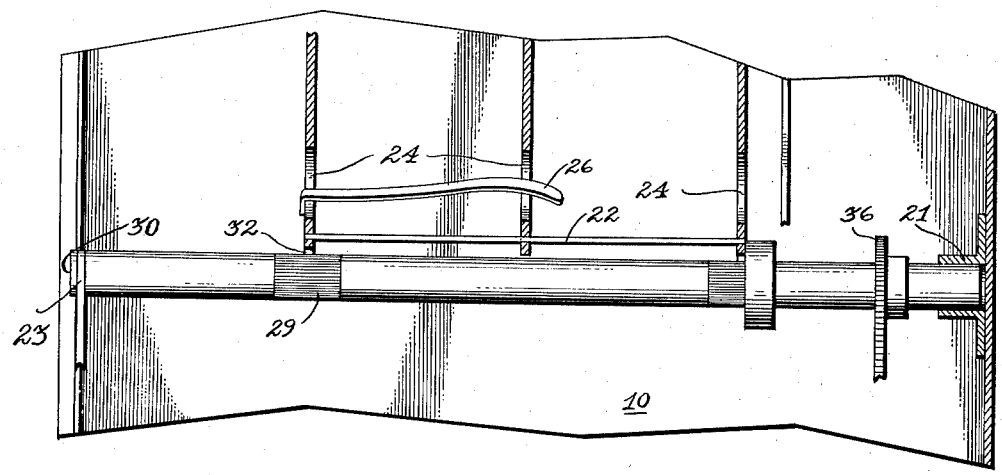
Figure 4 is a fragmentary detail on the line 4—4 of Fig. 3.
Figure 6:
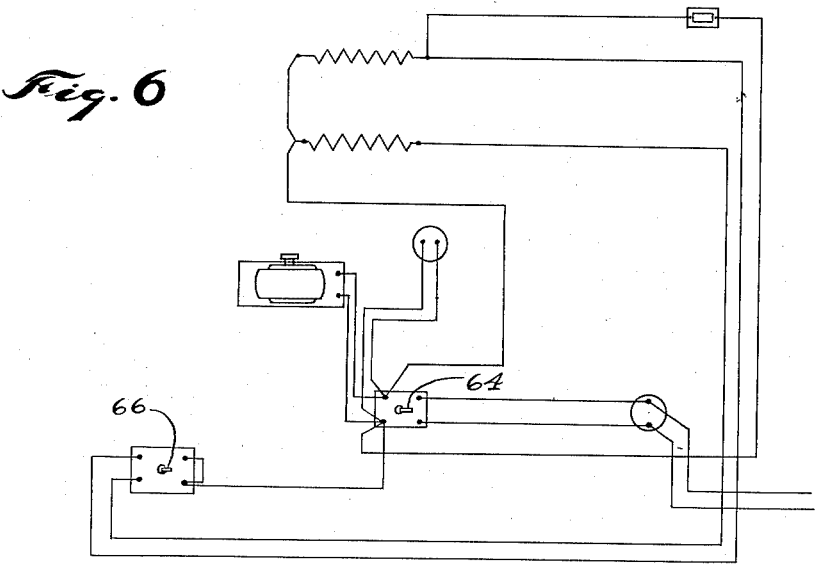
Figure 6 is a wiring diagram of the control circuit for the machine.

In the drawings the numeral 10 indicates a vertical housing or cabinet of sheet metal which may be fabricated in any suitable manner but which I prefer to provide with a glass panel 12 at the back through which the wieners may be seen cooking and with a door 14 on the opposite side which is opened to withdraw the wieners to be served.

The door 14 is preferably, as shown, fitted with a large transparent panel 16.

Within the cabinet I arrange at the upper part a tray 18 for supporting the buns with which the wieners are served, the heat for cooking and keeping hot the latter serving to keep the buns hot.

The tray 18 is made in the form of a shallow water retainer, holes being provided in its cover through which water vapour may humidify the buns.

Below the bun tray 18 I arrange a removable open center circular reel 20 formed by ring or annulus members 20a, 20b, 20c, spaced apart by welded angles 22 and provided with a series of holes 24 of a size such as to hold a wiener in aligned holes in the rings or annulus, and parallel to the axis of the reel.

A leaf spring 26 is arranged to be in each wiener containing space and formed to press against the wiener and hold it in position regardless of shrinkage of the latter during cooking by the heating means later described.

The open center wiener supply reel 20 is mounted for rotation and supported in position by two spaced horizontal rotatory shafts, 28, 30, mounted in bearings 21, 23, projecting from the casing.

The shafts are provided with toothed sections 29, 31 engaging with teeth 32 cut in the edge of one or more of the rings.

One of the shafts is driven or rotated by an electric motor 34 through belt 36, the other shaft acting as an idler as far as driving the cooking carrier is concerned but serving to ensure accurate rotation thereof in engagement with the driving shaft. The wiener supply reel may thus be lifted out of the machine as a complete unit. A stop ring is mounted on the end ring 20a to limit the inward movement of the wieners when being placed in the reel 20.

To supply the necessary heat to the wieners I provide an upper arcuate heating assembly 38 following the contour of the upper portion of the wiener supply reel, and a lower arcuate heater assembly 40 following the contour of the lower portion of the wiener supply reel. Each arcuate assembly is supported from the housing in any suitable manner as for instance by brackets 42 depending from an upper shelf and supporting the upper heating assembly above but concentric with the supply reel 20.

Brackets 44 project from the back of the casing into engagement with the lower heating element and support it above, and to follow the contour of the lower peripheral portion of the wiener supply reel.

A drip pan 46 is arranged within the supply reel 20 to extend across the lower heating element and protect it from grease dropping from the wieners passing below the upper heating assembly.

A lower drip pan 48 is arranged on the floor of the cabinet to catch grease dropping from the wieners passing below the lower heater.

Both upper and lower heating elements are formed as arcuate shells 50, 52 having insulating attachment plugs 54, 56, positioned along opposite sides of the shells.

Resistance units 58, 60 in the form for instance of the usual helically coiled length of high resistance metal are strung between the insulators.

Electrical current is supplied to the resistance units through the usual leads 62 through a main on off switch 64 and a regulator switch 66.

By means of the regulator switch and appropriate resistances the heat supplied to the wieners may be relatively high for a predetermined period such as six minutes after which a lower temperature may be maintained until all the wieners have been served.

Preferably a thermostat 67 is mounted in the circuit to prevent the wieners from being subjected to a too high heat.

It will be seen from the foregoing that I will be able to supply an auxiliary removable wiener supporting reel 20, so that while one reel 20 is in the heating chamber, a duplicate reel 20 may be refilled with wieners, so that when the first reel 20 in the unit has been exhausted of warm or hot wieners, the other or auxiliary reel 20 fully refilled with wieners may be easily and quickly inserted in the heating chamber with a minimum of lost time to keep the heating chamber at maximum production.

I claim:

1. A heating device for wieners and the like comprising: an enclosed housing having a door; an open centered wiener supply reel having a plurality of spaced apart annuli of equal diameter removed and positioned as a unit through said door; a circumferentially arranged series of aligned openings in said annuli, the edges of said openings forming supports for wieners inserted therein; resilient means for holding the wieners in said openings parallel to the axis of the reel, gear teeth cut in the edge of said annuli; horizontal shafts spaced apart and mounted for rotation in said housing, at lease one of said shafts being provided with toothed portions, the supply reel being supported in a vertical position on said shafts and held thereagainst solely by the action of gravity to be positioned thereby; means for rotating at least one of said shafts; first heating means arranged to heat the radially outer side of the wieners while they are moved through the upper portion of their path through the housing and second heating means arranged to heat the radially inner side of the wieners as they are carried through the lower portion of their path through the housing; a drip pan arranged in the open center of the wiener reel between the first and second heating means to prevent grease from the wieners passing through the upper portion of their travel from dripping onto said second heating means; and a shallow water holding vessel arranged in said housing above the wiener supply reel and having a cover over the upper surface of the vessel perforated for the passage of water vapor and effective to support buns to be eaten with the hot wieners, the buns being heated by the heat rising from the wiener heating means.

2. A heating device for wieners and like articles of food comprising: a housing provided with a door in one wall; spaced and rotatable horizontal shafts mounted in said housing; an open center rotary member comprising a plurality of spaced annuli having aligned openings to carry the wieners parallel to the axis of said shafts and member, and said member being supported by its periphery on said shafts solely by the action of gravity, said member being adapted to be placed in said housing and on said shafts and removed from said housing through said door; interengaging parts between one of said annuli and one of said shafts; means to rotate the shaft that interengages with said annuli and thereby rotate said member; an upper electrical resistance heating element for heating the wieners in the upper portion of their travel; a lower heating element for heating the wieners in the lower portion of their travel; a grease pan in the open center of said member to catch drippings from the wieners during the upper portion of their travel and prevent such drippings from contact with the lower heating element; and thermostatic control means effective to control the current flow through the resistance elements so that the electrical resistance means are operated at a sufficiently high temperature for a preliminary period to cook said wieners and thereafter operated at a lower temperature to keep said wieners hot until served.

3. A housing provided with an opening; a food holder comprising a plurality of spaced and connected open centered annuli having aligned openings to hold food products; a plurality of spaced shafts extending in parallelism with the axis of said annuli, and said annuli resting upon said shafts by gravity; one of said annuli and one of said shafts having inter-engaging parts; means to rotate said inter-engaging shaft and thereby rotate said annuli; heating means above and on the outside of the periphery of said annuli; heating means at the lower side of said annuli and within the open center of said annuli; said food holder being adapted to be removed from said housing through said opening; and a drip pan arranged in the open center of said annuli and above said lower heating means to prevent drippings from the food products contacting said lower heating means.

4. In combination, a food holder comprising open centered and spaced annuli connected together and provided with aligned openings to hold food products; shafts upon which said food holder rests by gravity; means to rotate one of said shafts; said rotated shaft and one of said annuli having coacting means to rotate said annuli; spaced heating elements, one of which is outside of said annuli and the other of which is within the open center of said annuli; and a drip pan arranged in the open center of said annuli and above the heating element within said annuli.

GEORGE WALTER JOHNSON.

REFERENCES CITED

The following references are of record in the file of this patent:

UNITED STATES PATENTS

| Number | Name | Date |
|---|---|---|
| 1,476,215 | Pace | Dec. 4, 1923 |
| 1,634,142 | Hammond | June 28, 1927 |
| 1,731,743 | Harrison | Oct. 15, 1929 |
| 1,847,529 | Harrington | Mar. 1, 1932 |
| 1,944,365 | Patchell et al. | Jan. 23, 1934 |
| 2,181,434 | Lewis et al. | Nov. 28, 1939 |
| 2,199,584 | Bemis | May 7, 1940 |
| 2,400,640 | Hanson et al. | May 21, 1946 |